(12) United States Patent
Pratolongo

(10) Patent No.: US 6,663,907 B1
(45) Date of Patent: Dec. 16, 2003

(54) METHOD AND APPARATUS FOR THE RAPID COOKING OF EDIBLE PASTAS SUCH AS SPAGHETTI AND THE LIKE, PARTICULARLY FOR HOME USE

(76) Inventor: Attilio Alfredo Pratolongo, c/o Bugnion S.p.A. Viale Lancetti, 17, Milano (IT)

( * ) Notice: Subject to any disclaimer, the term of this patent is extended or adjusted under 35 U.S.C. 154(b) by 0 days.

(21) Appl. No.: 09/831,404
(22) PCT Filed: Nov. 23, 1998
(86) PCT No.: PCT/IT98/00334
  § 371 (c)(1),
  (2), (4) Date: May 9, 2001
(87) PCT Pub. No.: WO00/30512
  PCT Pub. Date: Jun. 2, 2000

(51) Int. Cl.[7] .............................. A23L 1/00; A47J 27/00
(52) U.S. Cl. ......................... 426/509; 99/330; 99/331; 99/352; 99/407; 426/523
(58) Field of Search ................. 426/509, 523, 426/557; 99/330, 331, 352, 403, 407

(56) References Cited

U.S. PATENT DOCUMENTS 3,827,344 A * 8/1974 Pratolongo ................. 99/352
4,869,160 A   9/1989 Pratolongo ................. 99/330
4,954,359 A * 9/1990 Pratolongo ................. 426/509
5,361,682 A * 11/1994 Crolla ........................ 426/523

FOREIGN PATENT DOCUMENTS

WO    WO 92/14391    9/1992
WO    WO 95/14415    6/1995

* cited by examiner

*Primary Examiner*—George C. Yeung
(74) *Attorney, Agent, or Firm*—Young & Thompson

(57) ABSTRACT

A method and apparatus for the rapid cooking of edible pastas such as spaghetti and the like, particularly for home use, consisting of pre-heating a cooking chamber (3), of inserting into the cooking chamber a predetermined quantity of pasta (4) and essentially cold feed water initially obtaining steam, of compressing the water injected thereby bringing it immediately back to the liquid state, of maintaining the predetermined pressure for a preset time interval, of opening the cooking chamber (3) placing it in communication with a transit chamber (9) and of transferring the pasta and the residual water in a collection element (17).

23 Claims, 6 Drawing Sheets

METHOD AND APPARATUS FOR THE RAPID COOKING OF EDIBLE PASTAS SUCH AS SPAGHETTI AND THE LIKE, PARTICULARLY FOR HOME USE

TECHNICAL FIELD

The present invention relates to a method and an apparatus for the rapid cooking of edible pastas such as spaghetti and the like, particularly for home use.

BACKGROUND ART

As is well known, apparatuses for cooking spaghetti and the like rapidly, i.e. in extremely reduced times, have until now been designed and built for an industrial type of use, i.e. for employment in public organisations and venues. Their dimensions, costs and consumption are such as to prohibit in practice their use in home environments.

The aforementioned apparatuses generally comprise a cooking or pre-cooking chamber able to house a predetermined quantity of pasta obtained by means of an appropriate dosing device.

The cooking chamber presents at its top a valve element which can be opened for the insertion therein of the pasta and at least one opening for water injection.

The prior art provides for a hydraulic-thermal set comprising a pump and a boiler where the water is heated to be injected under pressure into the cooking chamber in order to impregnate the pasta housed therein.

The pasta and the residual water are then transferred into a stationing chamber, closed inside by a movable lid, through an expulsion canal fitted with a shut off valve.

In the stationing chamber, more water is absorbed by the pasta which then falls when the movable lid is opened into an underlying space able to house a dish.

During the application of the condiment the cooking of the pasta is completed with the total absorption of the water.

Appropriate coordinated command means control the operation of the dosing device, of the valve element positioned above the cooking chamber of the hydraulic-thermal set, of the shut-off valve in the expulsion canal of the pasta and of the movable lid.

In this situation the technical task constituting the basis for the present invention is to devise a method and an apparatus for the rapid and optimal cooking of edible pastas which reduce the complexity, the consumption, the dimensions and the costs observable in the prior art, thereby being usable also within the home environment.

DISCLOSURE OF INVENTION

The technical task as stated is substantially accomplished by a method and an apparatus for the rapid cooking of edible pastas such as spaghetti and the like which are characterised in that they comprise one or more of the technical solutions as described in the accompanying claims.

By way of indicative and non-limiting example, the description is now reported of a preferred but not exclusive embodiment of an apparatus for the rapid cooking of edible pastas according to the invention, illustrated in the accompanying drawings.

DESCRIPTION OF THE ILLUSTRATIVE EMBODIMENT

Figure 1:
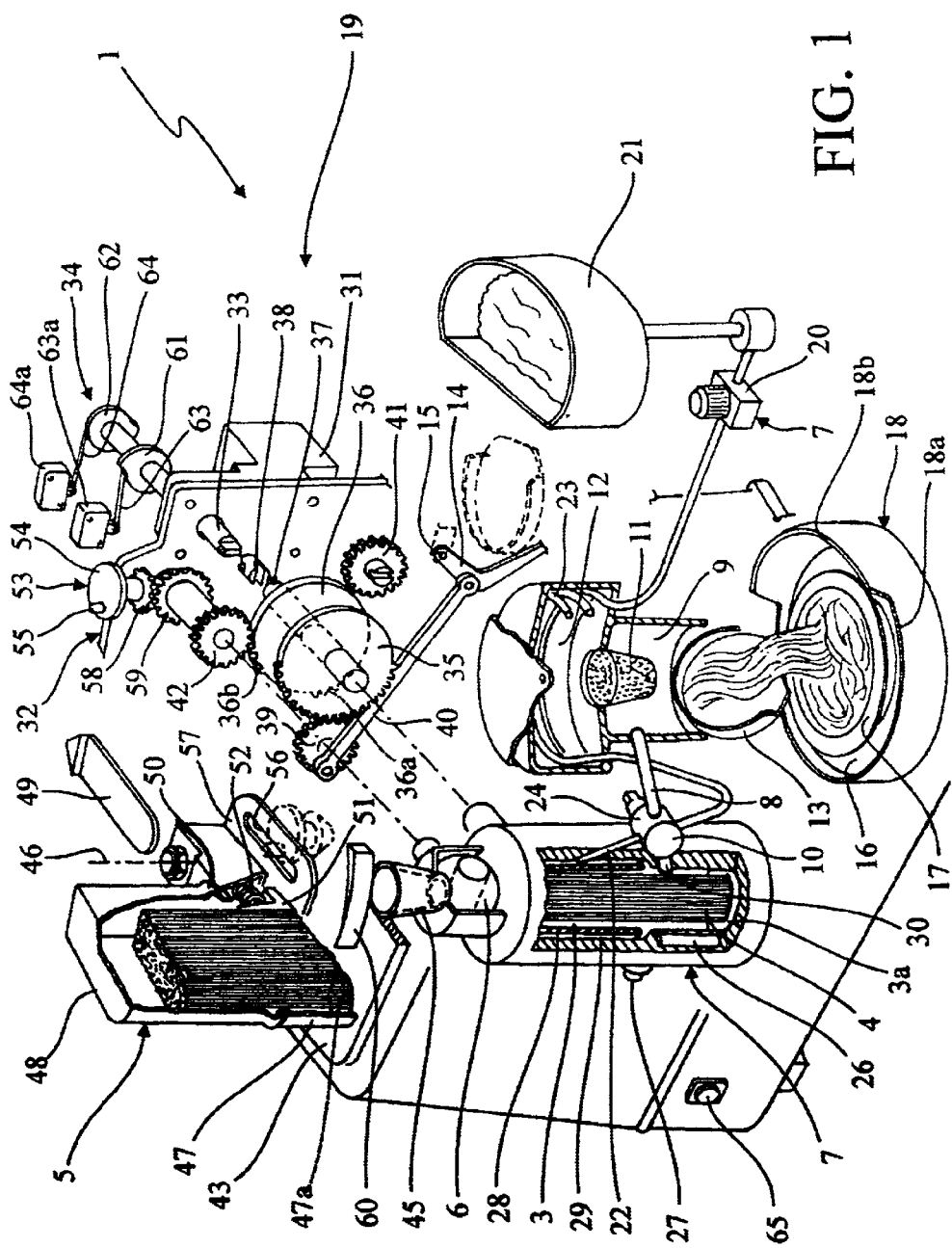
FIG. 1 shows a perspective exploded view of the apparatus according to the invention.
Figure 2:
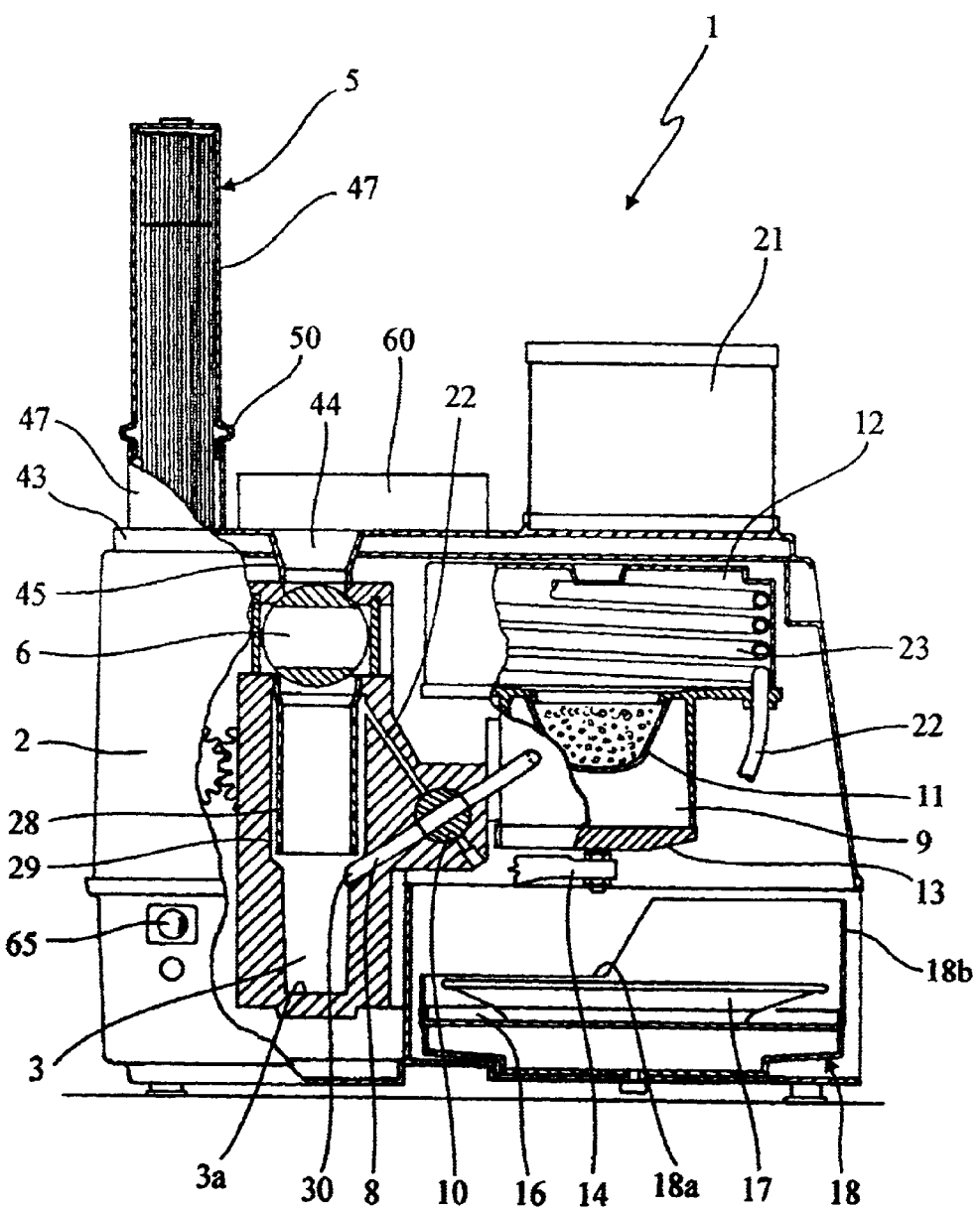
FIG. 2 shows a lateral vertical section of the apparatus of FIG. 1.
Figure 3:
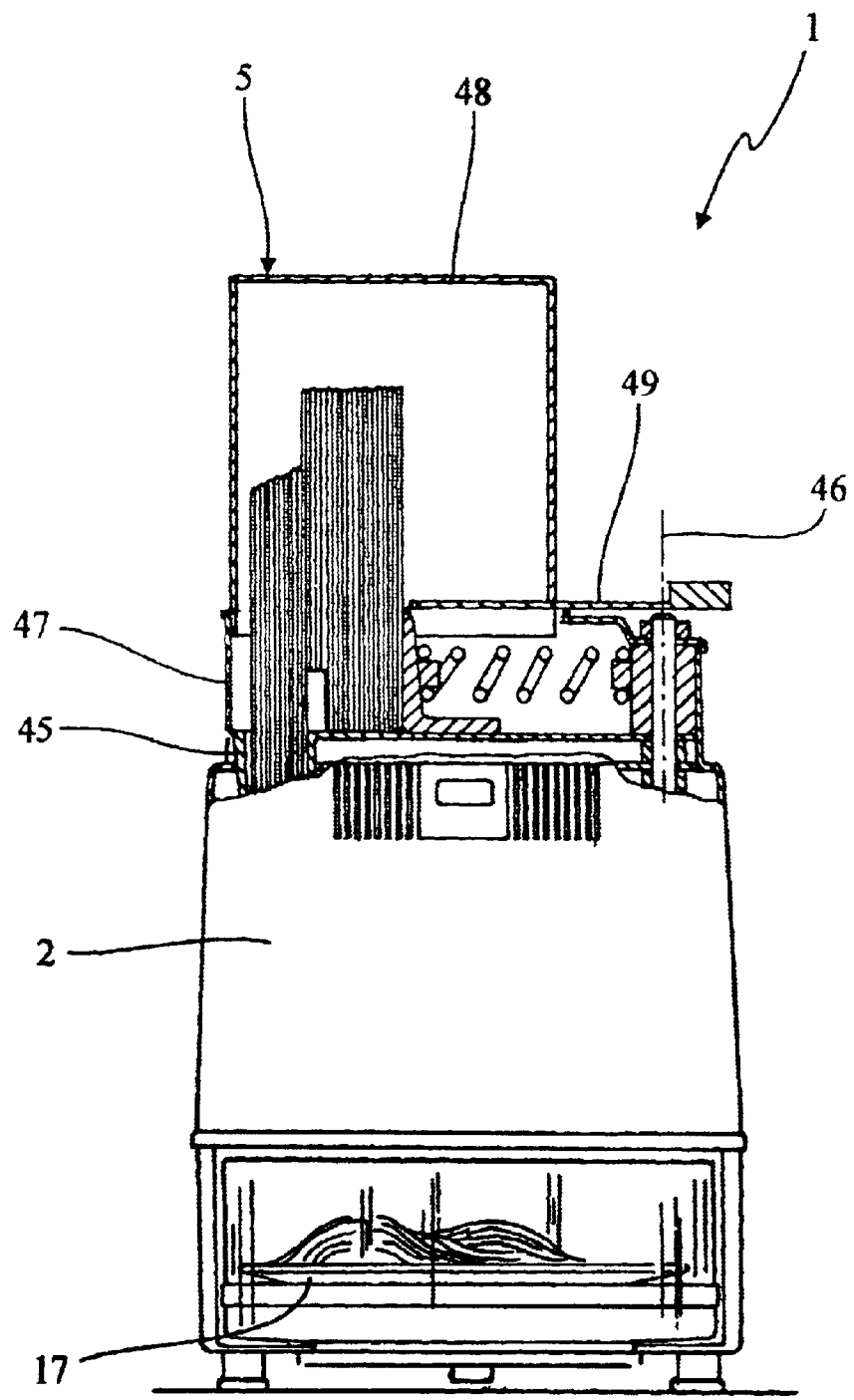
FIG. 3 shows a front view of the apparatus of FIG. 1.

With reference to the aforementioned figures, the apparatus according to the invention is indicated in its entirety with the number 1.

It comprises a base 2 whereon the various components are applied, among them a cooking chamber 3 preferably made of aluminium of considerable thickness, closed in its lower end by a bottom 3a and able to house a predetermined quantity of pasta 4, for instance a bundle of bucatini or spaghetti, obtained at the start of each operating cycle by means of a dosing device 5.

Preferably, the overall interior capacity of the cooking chamber 3 ranges between 2.5 and 3 times the volume occupied by the dose of pasta 4 introduced therein. In other words, once the dose of pasta 4 is introduced, the free volume within the chamber 3 substantially corresponds to the ideal quantity of water to complete the cooking of the pasta, in such a way that no excess water remains in the cooked pasta.

To the top of the cooking chamber 3 is associated a valve element 6, for instance a valve with spherical shutter, which can be opened for the insertion of the pasta into the cooking chamber 3 itself A hydraulic-thermal set 7, which shall be described below, rapidly impregnates with hot water the pasta 4 housed in the cooking chamber 3 thereby causing its softening.

An expulsion canal 8 places in communication the cooking chamber 3 with a transit chamber 9 of cylindrical shape and it is opened and closed selectively by means of a first shut off valve 10.

Above the transit chamber 9, integrally connected therewith and with the interposition of a filtering element 11, is positioned a chamber for the expansion of the steam 12.

The bottom of the transit chamber 9 is defined by a movable lid 13 manoeuvred from a bell crank 14 whose fulcrum is in the hinge point 15.

Below the transit chamber 9 is provided a space 16 for housing a collection element such as a dish 17 fitted with a rotating base or carrousel 18 able to support the dish itself and presenting an edge subdivided in a low sector 18a, which barely reaches the lower edge of the dish, and a high sector 18b which acts as a closure for the space 16 itself Appropriate coordinated means 19 provided for the actuation and operational control of the dosing device 5, of the valve element 6, of the hydraulic thermal set 7, of the first shut off valve 10 and of the movable lid 13.

Originally the hydraulic thermal set 7 is designed in such a way that, without using any boiler, i.e. any device for producing hot water at temperatures exceeding 100° C. outside the cooking chamber 3, the goal is reached of bringing, in extremely short time intervals, water at a considerably higher temperature than 100° C. into the cooking chamber itself, without the formation of superheated steam in contact with the pasta 4 with the consequent effect of superficially waterproofing the pasta, which would considerably hamper its water absorption during the various cooking phases.

More specifically the hydraulic thermal set 7 comprises at least one feed pump 20, preferably of the vibrating electromagnetic type, which receives the cooking water from a container 21, removable from the apparatus for cleaning and/or filling. The pump 20 sends the water essentially cold, in any case at a temperature indicatively no higher than 60° C., to the cooking chamber at a pre-set pressure through a delivery pipeline 22. The latter, prior to reaching the cooking chamber 3, travels through a steam expansion chamber formed by a coil heat exchanger 23 for the condensation of the steam itself.

Preferably, the coil 23 presents a capacity equal to the quantity of water to be introduced in the cooking chamber 3.

On the delivery pipeline 22 is provided, for the closure and opening thereof, a second shut off valve 24 whose movable organ is advantageously integrated with the movable organ of the first shut off valve 10 and hence forms therewith a single movable body 25 in such a way as selectively to determine, with a single rotatory actuation, the closure of the expulsion canal 8 and the opening of the delivery pipeline 22 and vice versa.

Heating means 26, defined by at least an electrical plug heater, are inserted directly in the thickness of the tubular body of the cooking chamber 3 and are able to pre-heat the latter to a temperature, for instance about 150° C., controlled by means of a thermostat 27. As stated above, the cooking chamber 3 advantageously presents walls of great thickness. In other words, the thickness of the walls of the cooking chamber 3 is chosen in such a way as to provide the latter with a thermal mass at least equal to the heat dissipated by the apparatus to complete the cooking cycle of one dose of pasta. Therefore, the thickness of the walls of the cooking chamber 3 can be appreciably greater than would be necessary for purposes of mechanical resistance to the pressure created in the cooking chamber itself during the cooking cycle of the pasta. Preferably, the cooking chamber 3 is externally provided with an insulating coating 3b to minimise heat transfer outside the cooking chamber itself.

In the top part of the cooking chamber 3 is fastened a tubular element 28 made of PTFE (polytetrafluoroethylene) suitable for the passage of the pasta and externally defining, in co-operation with a corresponding portion of the walls of the cooking chamber, a passage 29 of limited width, for instance presenting an average clearance not exceeding 1 mm, measured radially to the geometric axis of the cooking chamber itself The delivery pipeline 22 ends in the passage 29 in correspondence with its upper part while the expulsion canal 8 is positioned, inclined upwards, in continuation of a discharge port 30 of the cooking chamber 3 located immediately below the tubular element 28 and distanced from the bottom 3a thereof, preferably at about half the height development of the cooking chamber 3.

In this way the cooking chamber 3 can be positioned in proximity to the bottom of the base 2 thereby limiting the vertical size of the overall apparatus.

Originally the means 19 of coordinated command comprise a single gear motor 31, a plurality of kinematic mechanisms 32 mechanically slaved to a shaft 33 of the gear motor 31 and activation and arrest devices 34 which control the operation of the feed pump 20, of the gear motor 31 and of a timer (not shown).

The kinematic mechanisms 32 comprise a pair of driving gear wheels, i.e. a first driving gear wheel 35 positioned to the front in FIG. 1 and a second driving gear wheel 36 positioned to the rear, paired at a short mutual distance and splined onto a small shaft 37 connected by means of a joint 38 to the shaft 33 of the gear motor.

The first driving or forward gear wheel 35 is operatively connected to a first driven gear wheel 39 that is rotatorily coupled to a connecting rod 40 which in turn determines the oscillation of the bell crank 14 around the hinge point 15 and hence the actuation of the movable lid 13.

The second driving or rear gear wheel 36 is operatively connected to a second driven wheel 41 which determines the rotation of the movable body 25 of the shut off valves 10 and 24 positioned respectively on the expulsion canal 8 and on the cold water delivery pipeline 22.

The second driving wheel 36 is also operatively connected to a third driven gear wheel 42 which determines the motion both of the valve element 6 and of the dosing device 5.

More in detail, the first driving gear wheel 35 presents a continuous toothed sector which extends for half its circumference minus the space occupied by one tooth. The first driven wheel 39, totally toothed, presents a primitive diameter equal to half that of the driving wheel 35 and therefore, for every half rotation thereof, it completes an entire rotation and then remains motionless when the same driving wheel 35 completes the other half of its rotation. The reason for the missing tooth in the 180° toothed sector is that, during the rotation, the last tooth of the sector itself displaces two teeth of the first driven wheel 39, in the sense that it makes the first driven wheel 39 rotate according to an arc whose amplitude corresponds to two teeth thereof, before uncoupling therefrom.

The second driving gear wheel 36 presents two toothed sectors 36a and 36b of three teeth each shown in black dashed lines in FIGS. 4–9.

It should be noted that in this case as well the last of the three teeth of the sector 36a and 36b moves, during its rotation, two teeth of the driven wheels 41 and 42.

The latter present a primitive diameter equal to half that of the second driving wheel 36 and are provided with sixteen teeth each, i.e. with a number of teeth equal to four times the number of teeth (3+1) that constitute the toothed sectors 36a and 36b. Consequently each complete actuation of the toothed sectors 36a and 36b imposes the rotation of a fourth of a turn of one or the other of the driven wheels 41 and 42 which then remain motionless for the time corresponding to the rotation of the toothless part of the second driving wheel 36.

The dosing device 5 comprises a support plate 43 presenting a through opening 44 whereto is connected a truncated cone shaped canal 45 for conveying the pasta towards the valve element 6.

On the support plate 43 a tray 47 slidingly bears and is rotatorily engaged around a vertical axis of rotation 46; such tray is provided at its bottom with a discharge port 47a destined to position itself, at each operating cycle, in correspondence with the through opening 44 for the time necessary for the introduction of the pasta into the cooking chamber 3 by falling On the tray 47 can be applied a pasta container 48 comprising, for instance, a box of transparent material able to maintain the pasta bundle vertically aligned. Advantageously the container 48 presents at its lower end a bottom wall 49 removable by sliding along two longitudinal grooves 50 obtained on the sides of the container itself. The sides continue beyond the grooves 50 in order to be easily inserted into the tray 47.

A thruster element 51, slightly pressed by a spring 52, assures the suitable pressure to thrust the bulk of the pasta, without thereby excessively compacting it, against a terminal wall of the tray 47.

To couple the container 48 onto the tray 47, the user must first push on the thruster 51 contrasting the action of the spring 52 and then couple the container 48 and extract the sliding bottom 49.

In this way the pasta can descend into the tray 47 ready to be used.

The alternating rotatory motion around the axis 46 of the tray 47 is realised by a kinematic set 53 comprising a crank 54 provided with a pin 55 engaged in a slot 56 obtained in a bottom plate 57 integral with the tray 47 and coplanar with the support plate 43.

The crank 54 is integral with a bevel pinion 58 which meshes with a bevel gear 59 in turn splined onto the same shaft as the third driven gear wheel 42.

Above the support plate 43 is fastened a curvilinear separating blade 60 oriented radially with respect to the vertical axis of rotation 46 which, during the rotatory displacement of the tray 47, penetrates through a lateral slot 47b thereof, in the mass of the pasta contained in the same tray 47, separating therefrom a predetermined quantity corresponding to the required dose, for instance about 100 g.

The actuation and arrest devices 34 comprise a first cam 61 and a second cam 62 splined onto the shaft 33 of the gear motor 31, which respectively engage a first limit stop lever 63, connected to a first microswitch 63a, and a second limit stop lever 64 connected to a second microswitch 64a.

The microswitches 63a and 64a selectively determine, according to the position of the cams 61 and 62, the continued closure of the circuit that powers the gear motor 31, started from a pushbutton 65, and the opening thereof when the levers 63 and 64 descend into respective notches or radial offsets 61a, 62a of the respective cams 61 and 62.

Figure 4:
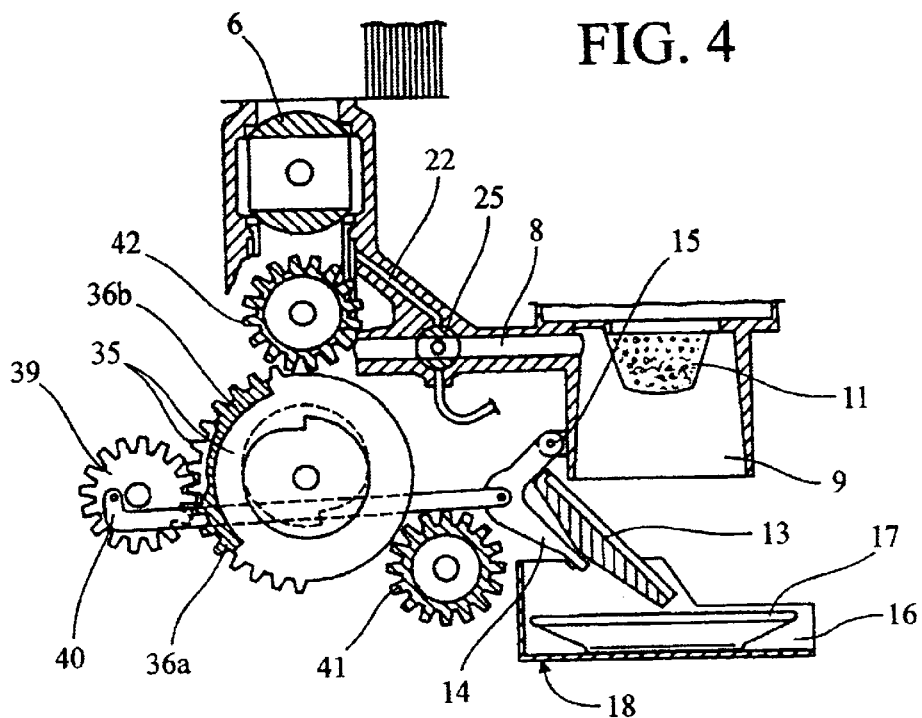
FIGS. 4, 5, 6, 7, 8 and 9 schematically show the operating phases of the apparatus of FIG. 1.

The operation of the subject apparatus, described above in a mainly structural sense, is as follows:

The operation of a pushbutton 65 activates the gear motor 31 whose shaft 33, starting to rotate from the position shown in FIG. 4, determines the raising of the first lever 63 and the closing of the electrical power supply circuit of the gear motor 31 by the first microswitch 63a.

Figure 8:
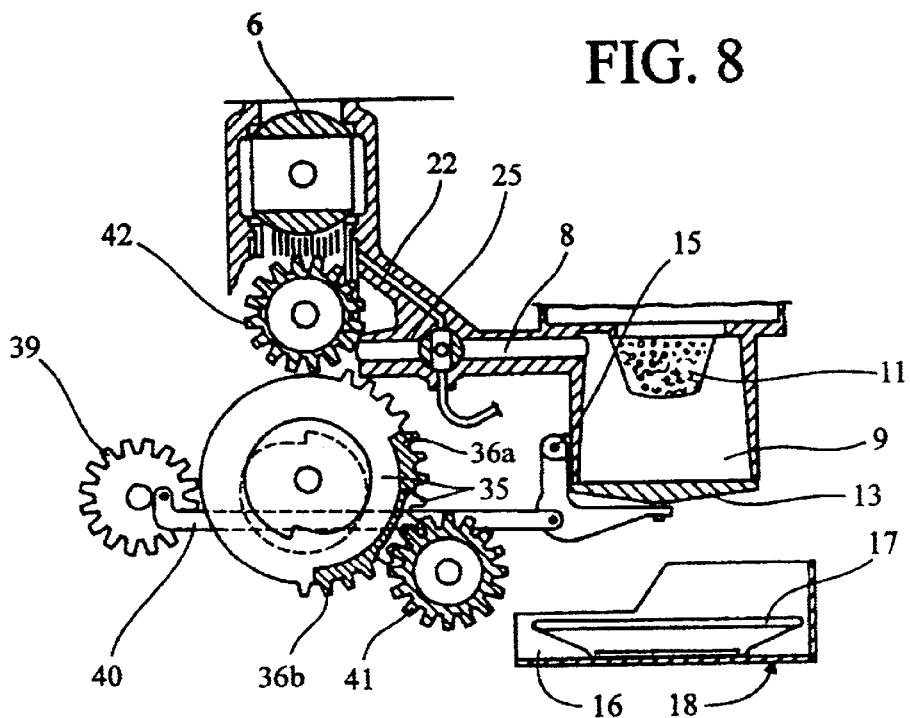
Figure 9:
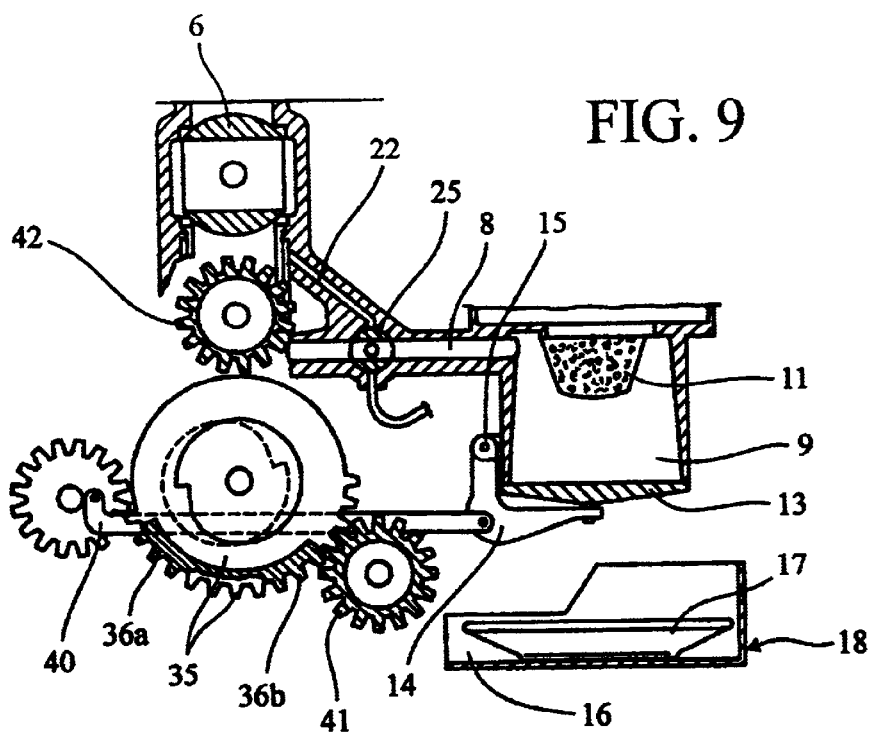

The driving gear wheels 35 and 36 initially rotate for about 180 degrees, i.e. until the second lever 64 descends into the notch 62a of the second cam 62 offset by that angle with respect to the notch 61a of the first cam 61 and causes the rotation to stop (see FIG. 8).

In the rest phase, shown in FIG. 4, which represents both the starting position and the final position of the various components during an operating cycle, the first driving wheel 35 engages the first driven gear wheel 39 at about midway in its toothed sector.

In this situation the movable lid 13 is open, the valve element 6 is closed, the movable body 25 of the shut off valves 10 and 24 is in such a position as to open the expulsion canal 8 and close the cold water delivery pipeline 22. The pasta of the previous cycle has already descended into the dish 17 and the latter has already been withdrawn after the rotating base 18 was positioned with the tow-edge sector 18a outwards, and the tray 47 of the dosing device 5 is in the initial position.

Figure 5:
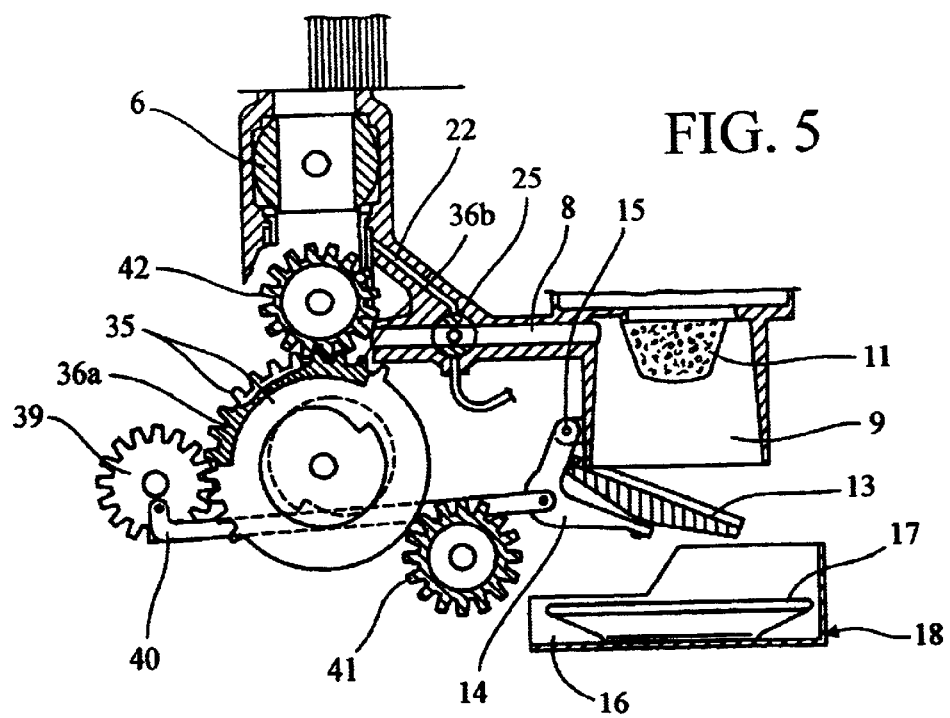

When the rotation of the driving wheels 35 and 36 is between the rest phase and a first operative phase, shown in FIG. 5, the following events take place: the movable lid 13 is closing, the valve element 6 is open because the toothed sector 36b has determined the rotation by a quarter of a turn of the third driven wheel 42, the movable body 25 is in the initial position, the tray 47 with the half-turn rotation of the bevel pinion 58 has moved in such a way as to place the discharge port 47a in correspondence with the through opening 44 of the support plate 43 and the blade 60 has penetrated in the tray 47 itself, separating a dose of pasta.

In practice, the pasta starts to fall into the underlying cooking chamber 3.

Figure 6:
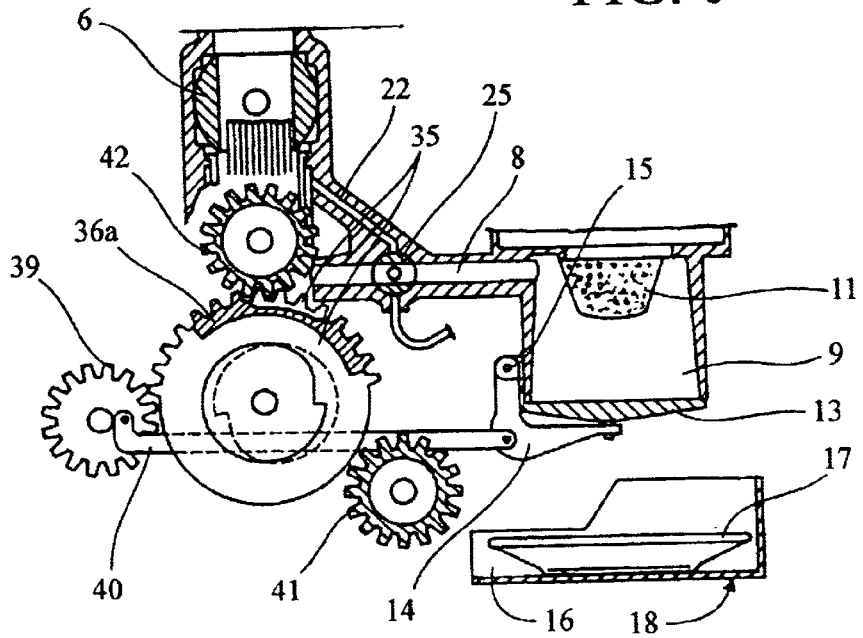
Figure 7:
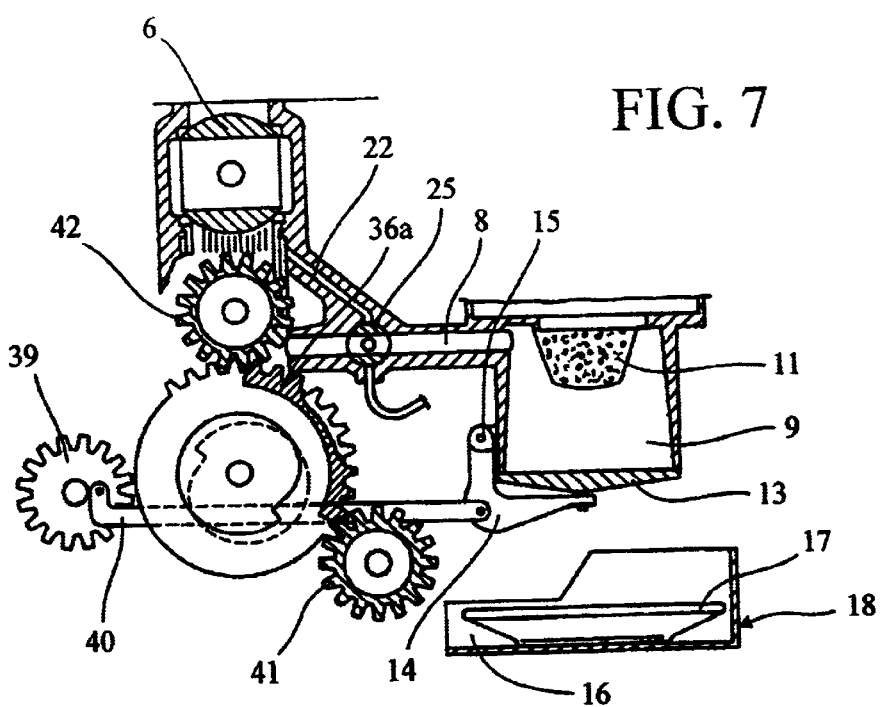

When the subsequent rotation of the driving wheels 35 and 36 is between the first operative phase and a second operative phase shown in FIG. 6, it can be observed that the closure of the movable lid 13 is complete, the valve element 6 remains open for the time required (about 1 second) to allow the pasta to fall into the cooking chamber 3, since the third driven wheel 42 has not yet been engaged by the successive toothed sector 36a, and the position of the movable body 25 remains unchanged.

The further rotation of the driving wheels 35 and 36 which leads to a third operative phase (FIG. 7) entails the following: maintaining the movable lid 13 closed since the first driven wheel 39 is in correspondence with the toothless sector of the first driving wheel 35; the rotation by a fourth of a turn of the third driven wheel 42 for engaging with the toothed sector 36a and hence closing the valve element 6; the return of tray 47 to its initial position where it is reloaded with pasta; the immobility of the second driven wheel 41 and hence of the movable body 25.

With the passage to the fourth operative phase shown in FIG. 8, the first and the third driven wheel 39 and 42 remain motionless and therefore the movable lid 13 and the valve element 6 remain closed, but the second driven wheel 41 has undergone a rotation of a quarter of a turn for engaging with the toothed sector 36b and hence there is the rotation of the movable body 25 that opens the delivery pipeline 22 and closes the expulsion canal 8.

In this angular position the second lever 64 descends into the notch of the respective cam 62 and the related microswitch arrests the gear motor 31, activates the feed pump 20 and starts a timer set on the cooking time (for instance about 40 seconds).

As an effect of the action of pump 20, the water contained in the coil 23, pre-heated in the previous cooking cycle, reaches the passage 29 of the cooking chamber 3 at atmospheric pressure and previously heated, for instance to 150° C., where there is an immediate evaporation due to heat transfer to the water by the walls of the cooking chamber itself.

The passage 29 wherein the steam is forced to transit already performs thereon a containment and compression action which prevents an excessive expansion and the consequent superheating.

In extremely short times the feed pump 20 fills the cooking chamber and exerts an overpressure for instance of 12–13 bar, i.e. equal to at least twice the pressure, of about 6 bar, whereat boiling occurs at the temperature, for instance 150° C., maintained inside the cooking chamber 3.

In practice the moist steam formed in the passage 29 and possibly in the cooking chamber 3 is immediately brought back by compression to the liquid state thereby allowing an adequate penetration of the hot water into the thickness of the pasta. Upon expiration of the time set by the timer, during which the pump 20 maintains the predetermined over-pressure, the feed pump itself stops and the gear motor 31 resumes its motion taking the driving wheels 35 and 36 to the position of the fifth operative phase shown in FIG. 9.

In this last phase due to the prior engagement of the toothed sectors 36a with the second driven wheel 41, the delivery pipeline 22 is closed and the expulsion canal 8 is opened. The sudden opening of the canal 8 causes a transformation of the pressure energy present in the cooking chamber 3 into kinetic energy which allows the rapid transfer of the entire content thereof, i.e. pasta, residual water and steam produced, into the transit chamber 9.

Steam expands passing through the filtering element 11 into the expansion chamber 12 where the coil 23, containing the cold water to be used in the successive cooking cycle, condenses the steam itself returning in liquid form the volatile organoleptic fraction of the cooked pasta. Finally the driving gear wheel 35, engaging the first driven wheel 39 determines the opening of the movable lid 13 and the fall of the pasta into the underlying dish 17 where, due to the further reduction in pressure, the pasta itself rapidly absorbs the residual water as well, thereby completing its express cooking (see FIG. 4).

The quantity of water introduced into the cooking chamber being equal to the ideal quantity for cooking the pasta, the opening of the movable lid 13 can advantageous take place in very short times, as soon as the transfer of the pasta and of the residual water in to the transit chamber 9 is complete, the waiting times necessary in the prior art to drain away excess water being eliminated.

The invention realises a new method which also forms integral part of the present patent.

It consists first of all of pre-heating a cooking chamber 3 to a predetermined temperature, for instance about 150° C. or more, and of inserting a predetermined quantity of pasta 4 into the cooking chamber itself.

After hermetically closing the cooking chamber 3 the method calls for the injection therein of water that is essentially cold, in any case at a temperature not exceeding 60° C. The water injected into the cooking chamber. 3 is heated to a predetermined temperature, for instance about 150° C. by heat exchange with the cooking chamber itself, initially obtaining steam which is immediately subjected to a pre-compression able to prevent the formation of superheated steam.

Upon completion of the filling of the cooking chamber 3 the water is compressed, applying to the fluid an overpressure exceeding the pressure whereat the water boils at said predetermined temperature, thereby immediately bringing back to the liquid state the portions of evaporated water.

For instance, for a temperature of 150° C., a pressure of at least 12 bar is established and maintained for a predetermined time interval in the cooking chamber 3, i.e. a pressure equal to at least twice the pressure whereat water boils at 150° C.

At the expiration of this time interval, which in the temperature and pressure conditions indicated above is equal to about 40 seconds, the cooking chamber 3 is opened and placed in communication with a transit chamber 9 under lower pressure, thereby causing its entire content to be transferred therein, i.e. partially cooked pasta and residual water and steam.

The steam generated as an effect of the instantaneous pressure drop is then expanded and condensed, in an expansion chamber 12 adjacent to the transit chamber 9, by heat exchange with the cold feed water contained in the coil 23.

The condensed steam falls onto the pasta present in the transit chamber 9 which is lastly transferred into a dish 17 wherein the residual water is absorbed and the cooking process is completed.

The invention attains important advantages.

The apparatus and the method described above allow to heat the water necessary for cooking the pasta directly in the cooking chamber whose walls are brought to the required temperature, thereby avoiding the use of a bulky and costly boiler necessary in the prior art.

It should be stressed that the apparatus according to the invention reaches the aim of guaranteeing a rapid and homogeneous heat exchange between hot water and pasta since in heating the cold water no superheated steam is produced which, as is well known, would compromise the absorption of the hot water by the pasta.

It should lastly be noted that the mechanical kinematic mechanisms which allow the selective actuation of the various components of the apparatus are all slaved to a single gear motor, thereby reducing the complexity and overall costs of the apparatus itself, and enhancing its reliability.

What is claimed is:

1. Method for the rapid cooking of edible pastas, comprising the steps of:
   pre-heating a cooking chamber (3);
   inserting a predetermined quantity of pasta into the pre-heated cooking chamber (3);
   closing said cooking chamber (3);
   injecting into the pre-heated cooking chamber substantially cold feed water, and heating the water to a predetermined temperature by heat exchange with the cooking chamber (3);
   compressing the water injected into the cooking chamber at a predetermined pressure exceeding the pressure whereat water boils at said predetermined temperature;
   maintaining said predetermined pressure of the water for a predetermined time interval;
   opening said cooking chamber and placing it in communication with a transit chamber (9) under lesser pressure, thereby causing the transfer therein of the entire content of the cooking chamber; and
   transferring the pasta and residual water into a collection element (17) wherein the cooking of the pasta is completed by absorption of the residual water itself.

2. Method according to claim 1, wherein in the transit chamber are completed the further steps of:
   expanding steam produced in an expansion chamber (12) adjacent to said transit chamber (9);
   condensing said expanded steam and sending the condensate back into the pasta.

3. Method for the rapid cooking of edible pastas according to claim 1, which further comprises the step of immediately subjecting steam forming during the injection of cold water into the pre-heated cooking chamber to an initial pre-compression which precedes said compression step, performed after the cooking chamber is completely filled.

4. Method according to claim 1, wherein said cooking chamber is pre-heated to about 150° C. and said predetermined pressure of the injected water is equal to at least 12 bar.

5. Method according to claim 4, wherein said pre-set time interval for which said predetermined pressure of the water in the cooking chamber is maintained is equal to about 40 sec.

6. Method according to claim 2, wherein said condensation of the steam in the transit chamber (9) is obtained by heat exchange with the cold feed water.

7. Apparatus for the rapid cooking of edible pastas, comprising:

a cooking chamber (3) able to house a predetermined quantity of pasta (4), a hydraulic-thermal set (7) able to impregnate with hot water the pasta housed in the cooking chamber (3), a transit chamber (9) of the pasta closed at a bottom by a movable lid (13), an expulsion canal (8) extending between the cooking chamber (3) and the transit chamber (9), wherein said hydraulic-thermal set (7) comprises:

a feed pump (20) able to send essentially cold water to the cooking chamber (3) at a pre-set pressure, and heating means (26) to pre-heat the cooking chamber, so that the water injected into the cooking chamber is heated to a predetermined temperature by heat exchange with the cooking chamber.

8. Apparatus for the rapid cooking of edible pastas according to claim 7, which further comprises a tubular element (28) fastened at the top in said cooking chamber (3) suitable for the transit of the pasta and externally defining a passage (29) in co-operation with a corresponding portion of the walls of the cooking chamber (3) said pump (20) being connected with the cooking chamber (3) by means of a delivery pipeline (22) which ends in said passage (29) in correspondence with the upper part thereof.

9. Apparatus according to claim 8, wherein said passage (29) presents an average clearance of less than 1 mm, obtained radially to a geometric axis of the cooking chamber (3).

10. Apparatus according to claim 7, which further comprises at least a first shut off valve (10) to close and open selectively said expulsion canal (8), and a second shut off valve (24) to close and open selectively a delivery pipeline (22) which connects the pump (20) to the cooking chamber (3), said first and second shut off valves (10, 24) presenting respective movable organs integrated in a single movable body (25) in such a way as to determine with a single activation the closure of the expulsion canal (8) and the opening of the water delivery pipeline (22) and vice versa.

11. Apparatus according to claim 7, which further comprises a dosing device (5) to introduce said predetermined quantity of pasta (4) into the cooking chamber at the start of each operative cycle.

12. Apparatus for the rapid cooking of edible pastas according to claim 10, which further comprises means for co-ordinated command (19) of a dosing device (5), of the hydraulic-thermal set (7), of said first and second shut off valves (10, 24), of said movable lid (13) and of a valve element (6) associated to the cooking chamber (3) and able to be opened for the insertion therein of the pasta; said co-ordinated command means (19) comprise:

a gear motor (31) with electric operation, kinematic mechanisms (32) that mechanically connect the gear motor (31) to the dosing device (5), to said valve element (6), to the movable body (25), to the first and to the second shut off valve (10, 24) and to the movable lid (13), and device for starting and stopping (34) the feed pump (20) and the gear motor (31).

13. Apparatus according to claim 12, wherein said kinematic mechanisms (32) comprise:

at least a driving wheel (35, 36) connected to the gear motor (31), a first driven gear wheel (39) operatively connected to said movable lid (13), a second driven gear wheel (41) operatively connected to said movable body (25) of said first and second shut off valve (10, 24), and a third driven wheel (42) operatively connected to said dosing device (5) and said valve element (6).

14. Apparatus according to claim 13, which further comprises a pair of driving gear wheels (35, 36) paired and mutually integral each fitted with toothed sectors alternated with toothless sectors in order to engage according to sequences of predetermined intermittence with said driven gear wheels (39, 41, 42).

15. Apparatus according to claim 14, wherein the ratio between the number of teeth of the driven gear wheels (39, 41, 42) and of said toothed sectors of the driving gear wheels (35, 36) is able to determine at each turn thereof intermittent rotations of the driven wheels equal to one fourth of a turn or to a multiple of one fourth of a turn.

16. Apparatus for the rapid cooking of edible pastas according to claim 11, wherein said dosing device (5) comprises:

a support plate (43) presenting a through opening (44) for the passage of the pasta (4) towards a valve element (6), a tray (47) open at the top and presenting at the bottom a discharge port (47a) destined to position itself at each operating cycle in correspondence with said through opening (44), said tray (47) being engaged rotatably according to a vertical axis of rotation (46) to said support plate (43) whereon it slidingly bears, a pasta container (48) applicable over said tray (47) and able to maintain the pasta aligned vertically, a curvilinear separating blade(60) oriented radially according to said vertical axis of rotation (46) able to separate a predetermined quantity of pasta (4) by penetrating into said tray (47) through a lateral slot (47b), a thruster element (51) able to thrust the pasta against a terminal wall of the tray (47), and wherein a command means (19) comprise a kinematic set (53) able to effect an alternating rotary displacement of said tray (47) around said axis of rotation (46).

17. Apparatus according to claim 16, wherein said pasta container (48) presents at its lower side a bottom wall (49) which can be extracted by sliding along two grooves (50) obtained on the flanks of the container itself.

18. Apparatus according to claim 7, wherein said cooking chamber (3) presents a discharge port (30) whereto said expulsion canal (8) is connected positioned at a distance from a lower base (3a) of the cooking chamber (3).

19. Apparatus according to claim 7 wherein said expulsion canal (8) is positioned inclined upward starting from a discharge port (30) connected to the cooking chamber (3).

20. Apparatus according to claim 7, which further comprises a space (16) for housing a collection element (17), said space presenting a rotating base (18) able to support the collection element (17) and provided with an edge subdivided into a low sector (18a) and a higher sector (18b) for the closure of the space itself.

21. Apparatus according to claim 7, wherein said hydraulic-thermal set (7) comprises a removable container (21) for the cooking water taken in by the feed pump (20).

22. Apparatus according to claim 7, wherein said cooking chamber presents a capacity corresponding to the sum of the volumes of the dose of pasta (4) and of the quantity of water to be employed for cooking that pasta.

23. Apparatus according to claim 7, wherein said heating means comprise electrical resistors (26) inserted directly in the walls of the cooking chamber (3).

* * * * *